June 15, 1926.
H. C. SALLAC
PAN LIFTER
Filed June 6, 1924
1,588,774
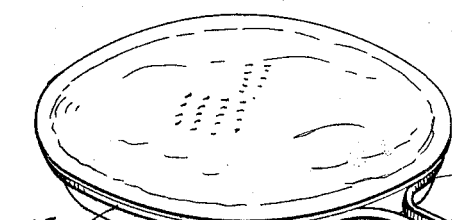
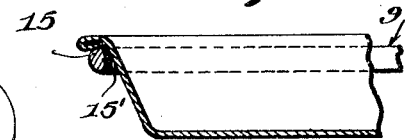
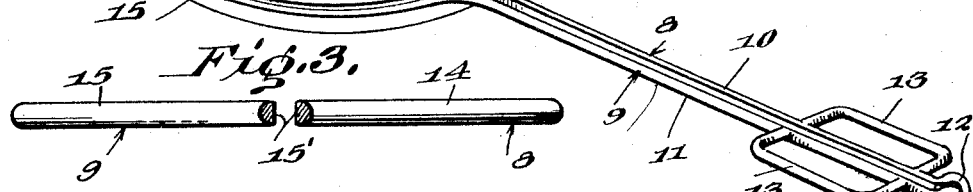
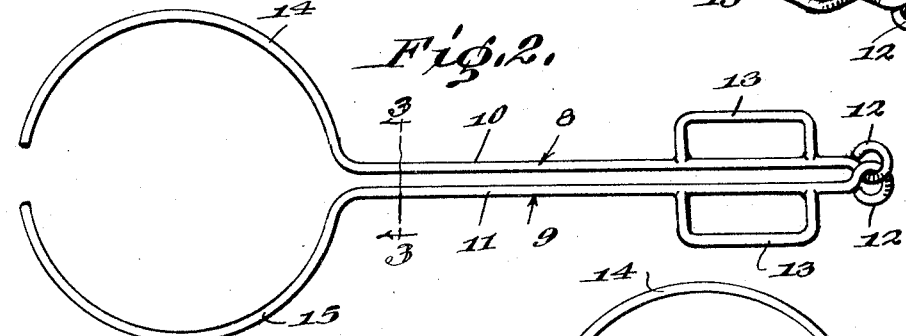
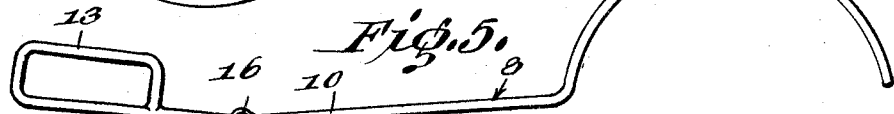
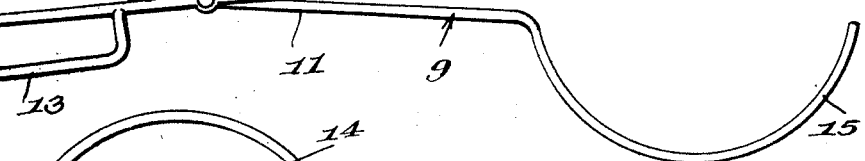
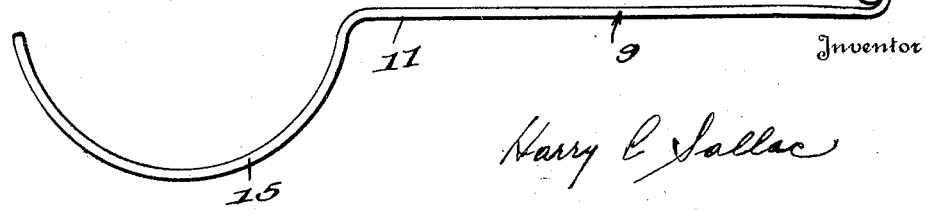
Inventor
Harry C. Sallac Patented June 15, 1926.

1,588,774

UNITED STATES PATENT OFFICE.

HARRY C. SALLAC, OF ST. LOUIS, MISSOURI.

PAN LIFTER.

Application filed June 6, 1924. Serial No. 718,294.

The present invention relates to pan lifters, and aims to provide a novel and improved device of that kind for conveniently and efficiently lifting hot pans and the like from an oven, thus eliminating the necessity of using tea cloths or the like, and obviating injury to the person handling said pans.

Another object is the provision of a novel pan lifter having arcuate pan engaging members arranged for efficiently gripping a pan therebetween, said arcuate pan engaging members being flat at the portions contacting with the pan so that the same may firmly engage the pan beneath the bead or rim thereof to prevent the pan from slipping through said arcuate members.

A further object of the invention is to provide a pair of pivoted arms for moving pan engaging members into and out of engagement with a pan, said arms being flat at the portions adjacent each other so that said arms will firmly engage each other should the pan engaging members flex or warp with relation to each other, due to an over amount of pressure being applied on the handles. By the engagement of the flat portions the dropping of the pan and damaging of the contents therein and the burning of the user are eliminated to a great extent.

It is also an object of the invention to provide a pan lifter of the kind indicated, which is simple and substantial in construction, which can be manufactured economically, and which will be thoroughly efficient and practical in use.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawings, wherein

Figure 1 is a perspective view of my improved device, showing the same in engagement with a pan, Figure 2 is a plan view of my improved device, Figure 3 is a section on line 3—3 of Figure 2.

Figure 4 is a section through one of the arcuate arms and a portion of a pan, showing the manner of engagement of the arm with the pan.

Figure 5 is a plan view of a modified form of my invention, and

Figure 6 is a plan view of a still further modified form of the invention.

In carrying out the invention there is provided a pair of arms 8 and 9, each having a straight or handle portion 10 and 11. At one end of each arm 8 and 9 is arranged an eye or ring 12 for engaging through the eye or ring arranged on the other member, to provide a pivotal connection for attaching said arms 8 and 9 together. Adjacent the eye or ring 12 of each arm is provided a U-shaped member 13 having its ends permanently secured to said arms to provide a loop on each of said arms through which the fingers of the user are adapted to pass.

The opposite ends of the arms 8 and 9 are curved outwardly and then inwardly to provide a pair of arcuate members 14 and 15 for engaging the opposite sides of a pan. Said arcuate portions 14 and 15 are of sufficient length to permit substantial engagement of the arms with the pan.

Each of the arms 8 and 9 is round on its outer surface, and flat on its inner surface, said flat surfaces being indicated by the numeral 15'. The flat portions on the arcuate ends of the arms will firmly engage the pan beneath the rim or bead thereon, thus eliminating the tendency of the pan to slip through or between the arcuate portions. It is to be noted that the sharp edge at the upper portion of the flat side will engage at the bend where the bead or rim is formed on the pan, thus eliminating such slipping as above referred to. The flat sides on the straight or handle portions 10 and 11 will lie parallel and adjacent each other when the arcuate portions are in engagement with a pan, so as to engage each other should the arcuate portions 14 and 15 flex due to excessive pressure on the handles. The engagement of the flat portions on the handles will prevent one handle from slipping past the other which would cause the dropping of the pan.

In operation the fingers of one hand of the user are passed through the loops 13 so that the arcuate portions 14 and 15 may be moved away from each other a sufficient distance to permit said arcuate portions to engage under the rim or bead of a pan, and by drawing the fingers together the pan will be firmly engaged between said arcuate portions, thus permitting the lifting of the pan from an oven or the moving of the pan as may be desired.

In Figure 5 there is illustrated a different manner of pivoting the arms 8 and 9 together. In this form the straight or handle portions 10 and 11 cross each other and are pivoted together at their crossing portions, as indicated at 16, so that the operation of the device is similar to the operation of a pair of shears.

In Figure 6 I have a still further modified form. Instead of having two separate arms 8 and 9, the handles and the arcuate portions are made of a single strand of wire, said wire being looped as indicated by the numeral 17 to provide a means for permitting the arcuate portions 14 and 15 to move towards or away from each other.

Having thus described my invention, what I claim as new is:

A pan lifter comprising a pair of arms having straight portions and arcuate end portions, the said arms being provided at their inner opposite edges with plane flat surfaces and having transversely convex outer surfaces, the arms being provided at their ends opposite the arcuate end portions with inter-linked eyes, the said eyes being twisted with relation to the plane flat surfaces whereby they approximately lie in planes disposed at acute angle to the planes of the flat surfaces of the arms.

In testimony whereof, I have affixed my signature.

HARRY C. SALLAC.